US006603501B1

(12) United States Patent
Parry et al.

(10) Patent No.: US 6,603,501 B1
(45) Date of Patent: Aug. 5, 2003

(54) VIDEOCONFERENCING USING DISTRIBUTED PROCESSING

(75) Inventors: James H. Parry, Los Gatos, CA (US); See-Mong Tan, Half Moon Bay, CA (US)

(73) Assignee: Onscreen24 Corporation, Sunnyvale, CA (US)

(*) Notice: Subject to any disclaimer, the term of this patent is extended or adjusted under 35 U.S.C. 154(b) by 0 days.

(21) Appl. No.: 09/721,547

(22) Filed: Nov. 21, 2000

Related U.S. Application Data

(60) Provisional application No. 60/218,073, filed on Jul. 12, 2000.

(51) Int. Cl.$^7$ .................................................. H04N 7/14
(52) U.S. Cl. ................................ 348/14.12; 348/14.11; 348/14.13
(58) Field of Search ...................... 348/14.01, 14.02, 348/14.03, 14.04, 14.05, 14.07, 14.08, 14.09, 14.1, 14.12, 14.13; 370/260, 261; 709/204; H04N 7/14

(56) References Cited

U.S. PATENT DOCUMENTS 5,684,527 A * 11/1997 Terui et al. ............... 348/14.09
5,914,747 A * 6/1999 Hamilton ................. 348/14.08
6,269,483 B1 * 7/2001 Broussard ................ 348/14.12

FOREIGN PATENT DOCUMENTS

JP 401293058 A * 11/1989 ............. H04N/7/14
JP 408046703 A * 2/1996 ............. H04N/7/15

OTHER PUBLICATIONS

PictureTel Introduces PictureTel 331 TeamConference Multipoint Conferencing Software for the Intel TeamsStation, Nov. 19, 1999, Company Press Release [online]. PictureTel Corporation [retrieved on Nov. 22, 1999]. Retrieved from the Internet: <URL: http://biz.yahoo.com/bw/991119/ma_picture_2.html>.

* cited by examiner

Primary Examiner—Melur Ramakrishnaiah
(74) Attorney, Agent, or Firm—Hamilton & Terrile, LLP; Robert W. Holland

(57) ABSTRACT

A video teleconferencing system and method transfers video teleconferencing signals from a sender to a receiver. The sender determines decision information based on internal or external factors. The sender may or may not generate a video teleconferencing signal depending on the content of the decision information. If generated, the video teleconferencing signal is encoded at the sender and sent to the receiver. Each sender includes at least one memory module for storing the decoded signal, each memory module is one group. The sender updates its memory module with a copy of each sent video teleconferencing signal. The receiver decodes the signal and presents the signal to the user of the receiver. The receiver stores a copy of the signal in a memory module identified with each specific sender.

51 Claims, 5 Drawing Sheets

VIDEOCONFERENCING USING DISTRIBUTED PROCESSING

CROSS-REFERENCE TO RELATED APPLICATION

This application claims priority, under 35 U.S.C. § 119(e), from U.S. Provisional Patent Application Serial No. 60/218,073, "Video Teleconferencing Using Distributed Processing," by Parry and Tan, filed Jul. 12, 2000, the entirety of which is herein incorporated by reference.

BACKGROUND OF THE INVENTION

1. Field of the Invention

This invention relates generally to multipoint conferencing, for example, multipoint videoconferencing between multiple participants. More particularly, the invention relates to multipoint videoconferencing in which the computer processing used to implement various conferencing functions is distributed among the conferencing terminals used by the conference participants.

2. Description of the Related Art

As the result of continuous advances in technology, videoconferencing is becoming an increasingly popular means of communication. The development and standardization of advanced coding/decoding and compression/decompression schemes has facilitated the communication of ever larger amounts of information over communications links of limited capacity. Technological advances in the communication links themselves and increases in the sheer number of links have further increased the effective number of communications links that are available to carry videoconferencing information. Advances in the basic components used in videoconferencing systems, such as computers, cameras, video displays, audio speakers and microphones, have resulted in the availability of better quality components at lower prices.

These advances translate to more powerful videoconferencing systems available at lower prices. Video and audio quality has improved, as has the capability to combine the basic videoconferencing functionality with other functionalities, such as presentation software, desktop publishing applications, and networking. As a result, videoconferencing systems have progressed from being expensive novelty systems, which were used infrequently, to moderately priced systems which were more often used but still located in a dedicated facility shared by many users, to relatively inexpensive systems, which one day may be as ubiquitous as the telephone is today.

Current videoconferencing systems may be operated in a point-to-point mode between users of videoconferencing terminals or may include a number of clients connected to each other by a centralized multipoint control unit (MCU). The clients are the local systems used by the participants in the videoconference. Much, if not all, of the videoconferencing functionality is typically implemented by the MCU. As a result, the MCU is often a complex and expensive piece of equipment. For example, current MCU's may implement half of the signal processing and all of the decision making required to implement a videoconference. The MCU may be required to decode audio signals received from each client, mix the received audio signals together to generate appropriate audio signals to be transmitted to each client, and then re-encode and retransmit the appropriate mixed signal to each client. The MCU may perform analogous functions on the video signals generated by each client. Furthermore, the MCU typically also determines, according to some predefined method, which video signals (or which combinations of video signals) should be sent to which clients. As the number of clients increases, the functions required of the MCU increase correspondingly, quickly making the MCU prohibitively complex and expensive.

Note that in the above scenario, the audio signals and possibly also video signals experience both tandem encoding and multisource encoding, each of which reduces the quality of the signals. Tandem encoding means that a signal has been repeatedly and sequentially encoded and decoded. Here, the source client encodes its audio signal, which is decoded and mixed by the MCU. The MCU then encodes the mixed signal (i.e., tandem encoding), which is decoded by the destination client. Since the encoding algorithms used typically are lossy (i.e., the recovered signal is not a perfect replica of the original signal), each time a signal is encoded and decoded the quality of the signal decreases. Tandem encoding introduces significant delay and impairs natural communication. Multisource encoding of the audio signal is the encoding of an audio signal produced by more than one source (i.e., a mixed signal). Because the encoding algorithms typically are optimized for single source signals, encoding a signal from more than one source also results in a lower quality signal.

If the MCU is also responsible for determining which signals are to be mixed and sent to which clients, it typically must receive audio and video signals from all of the clients and then determine what to do with these signals. For example, with respect to video which is transmitted in packets, the MCU is continuously receiving video packets. Once the MCU has received these video packets, it must determine which of these video packets to forward to destination clients. This determination in its own right may be computationally intensive. The video packets that are not mixed or forwarded are simply discarded by the MCU and need not have been transmitted to the MCU in the first place. The transmission of video packets not required by the MCU creates unnecessary traffic on the network, thus wasting valuable bandwidth and unnecessary encoding work in the sending client.

Another approach to videoconferencing is to have each client indiscriminately broadcast its audio and video signals to all other clients. Because each signal goes directly to all other clients without any intermediate decoding, mixing or re-encoding, this method eliminates the need for tandem encoding and multisource encoding. However, continuously encoding, sending, receiving, and decoding video and audio signals from all clients to all other clients taxes both the network and the clients, particularly as the number of clients increases.

In view of the foregoing discussion, there is a need for a videoconferencing system that reduces or eliminates the cost of the MCU function. There is also a need for a videoconferencing system that does not require tandem encoding and/or multi-source encoding. There is a further need for a videoconferencing system that does not indiscriminately send video packets, but rather sends video packets only (or preferably) when they are to be received and utilized by other clients. There is also a need for a videoconferencing system that can accommodate an increased numbers of clients on a given network.

SUMMARY OF THE INVENTION

The present invention comprises a videoconferencing system, method and apparatus that may take advantage of distributed processing techniques. In a preferred embodiment, the system includes two or more apparatus connected via a network in order to transfer video and audio signals. A sending client can apply various internal and/or external factors to a decision algorithm. Based on this algorithm, the sender decides whether to generate and send video and/or audio signals. Because the decision to send signals is made locally at the sender, all signals generated and sent, preferably, will be received and utilized by at least one receiving client. Each sender encodes the signal it generates before it sends the signal. This signal is then decoded at the receiver, preferably without any intermediate decoding or encoding.

Each sending client may include multiple decoders and memory modules such that the client can store a copy of the signals sent to each receiver. As a result, the sending client can compare the current image with the immediately preceding image that was sent to any particular receiving client. If there was no change, then no new image need be sent; otherwise only a difference signal is sent, thus increasing the overall efficiency of the videoconferencing system.

Similarly, each receiving client may include multiple decoders and memory modules, such that the receiving client can store a copy of the signals, if any, received from each sender. As a result, the receiving client can, either manually under command from a user or based upon an automated decision algorithm, display the audio and/or video signals from various senders. Preferably, of course, in order to conserve bandwidth, each receiving client sends a command instruction to each sending client instructing them not to send any signals if the same will not be displayed and played at the receiving client.

BRIEF DESCRIPTION OF THE DRAWINGS

The invention has other advantages and features that will be more readily apparent from the following detailed description of the invention and the appended claims, when taken in conjunction with the accompanying drawings, in which:

DETAILED DESCRIPTION OF THE PREFERRED EMBODIMENTS

Figure 1:
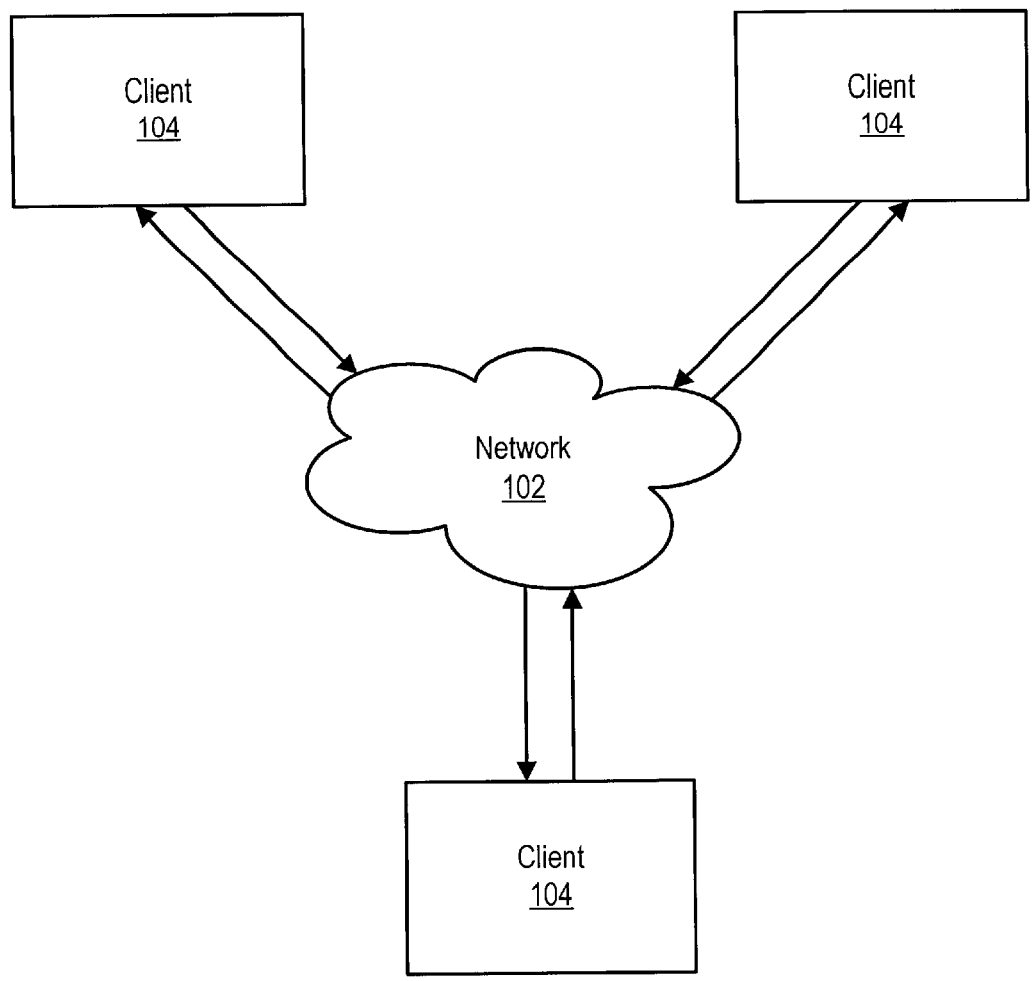
FIG. 1 is an illustration of a preferred embodiment of a system including the present invention.

FIG. 1 is an illustration of a preferred embodiment of a system including the present invention. The system includes a network 102 and at least two clients 104. The clients 104 are each connected to the network 102. The network 102 may be an intranet, the Internet, a local area network, a point-to-point connection, or any other means of connecting two or more videoconferencing units together for the purpose of sending and receiving audio and video signals. The client 104 is a videoconferencing terminal. In a preferred embodiment, some clients 104 are both a sender and receiver of audio and video signals. Client 104 may have any number of configurations of audio and video equipment to facilitate sending or receiving audio and video signals. For instance, in one embodiment, client 104 may include a video display unit, an audio speaker, a camera, a microphone and a processing unit running suitable software for implementing the videoconferencing functionality discussed in greater detail below. In this embodiment, the video display unit and speaker are used by the receiving portion of the client to present the received sounds and image signals to the user. The camera and microphone are used by the sending portion of the client to create the video and audio signals sent by the client. The client 104 uses the processing unit in both the sending and receiving processes.

Figure 2:
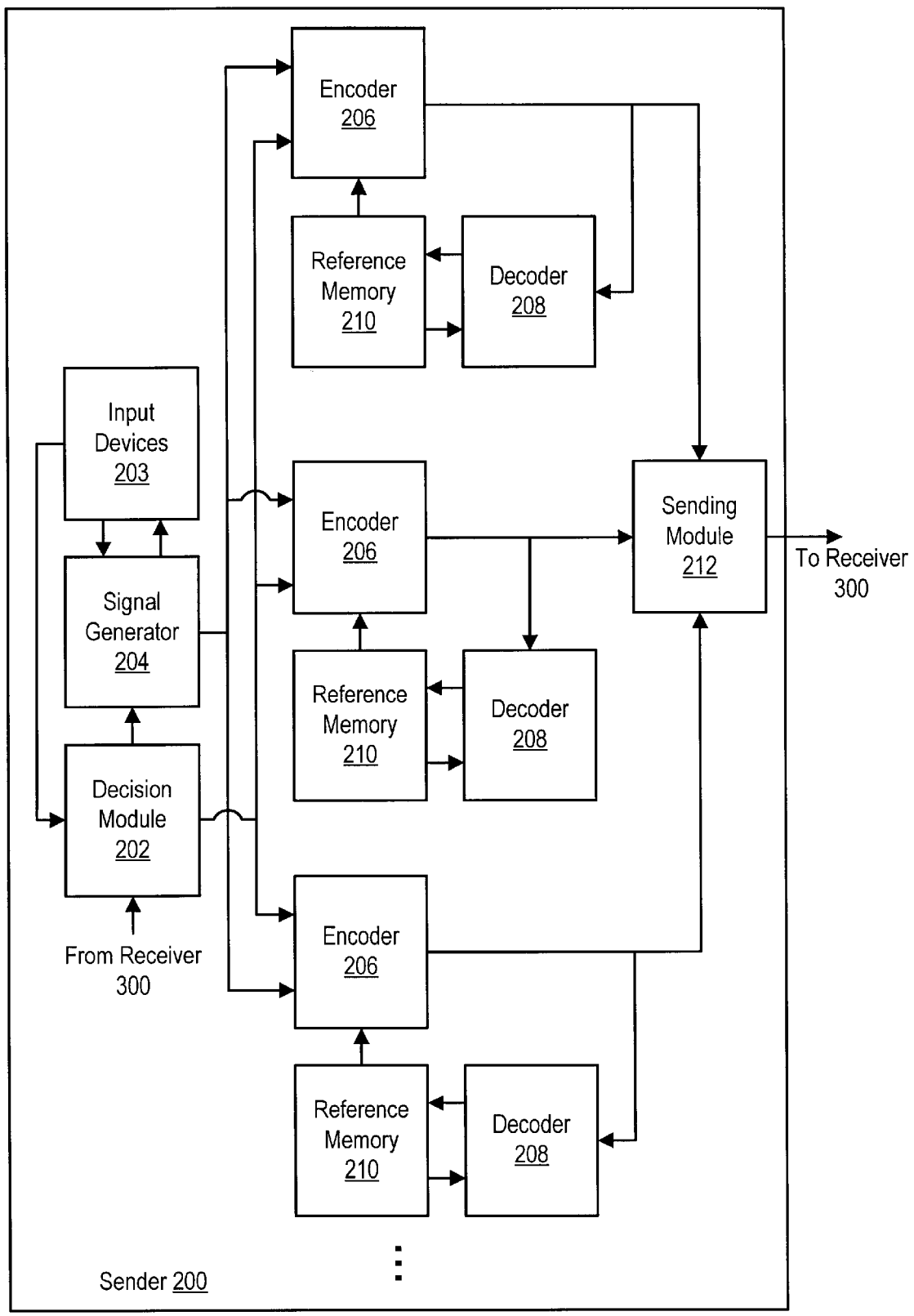
FIG. 2 is a block diagram of one embodiment of a sending client.

FIG. 2 is a block diagram of one embodiment of a sender or sending client 200. In this embodiment, the sender or sending client 200 includes input devices 203, a signal generator 204, a decision module 202, at least one encoder 206, at least one reference memory 210, at least one decoder 208, and a sending module. The signal generator 204 is connected to the input devices 203, the decision module 202, and the encoders 206. Each encoder 206 is also connected to a reference memory 210, a decoder 208, and the sending module 212. Each decoder 208 is also connected to a reference memory 210. The sender 200 is the portion of the videoconferencing client 104 that is responsible for sending audio and video signals.

The input devices 203 are used to create the video and audio signals. In a preferred embodiment, the input devices 203 include at least one camera and microphone. The input devices 203 may also include devices such as document readers, VCRs, DVD players, application programs, MP3 files, and CD players to name a few. Other combinations of input devices may also be used. Note that the signal generator 204, decision module 202, encoders 206, reference memories 210, decoders 208, and sending module 212 may be implemented as hardware or software, which is stored on a computer-readable medium such as a disk, and executed by a processor.

In a preferred embodiment, the signal generator 204 receives an input from the various input devices 203. The signal generator 204 converts the input into data packets. Each data packet may contain video, audio, graphics, alpha-numeric or some other form of data. As the signal generator 204 receives a video signal from the camera, for example, it breaks the signal as down into a series of images. The signal generator 204 converts these images into one or more video packets with headers that include the destination addresses for those packets. It is understood that the signal may also be sent in a form other than packetized data. For instance, any multiplexing format may be used including frequency division, time division, code division, spread spectrums, and wavelength division. In a preferred embodiment, the signal generator 204 similarly translates the audio signal into packetized data for transmission across the network 102. In another embodiment, the sender may function without a signal generator 204. In this case, the input devices will send audio and video signals directly to the encoders 206, and the decision module 202 is configured to directly control the encoders 206. This embodiment is not shown in FIG. 2.

The decision module 202 determines whether the sender 200 will send audio and/or video signals to any receiving client 104 via network 104. The decision module 202 makes this determination based on any number of local or external factors. The local factors are based on information received from the input devices 203 and may include, by way of example, the volume of the local audio signal, a timer, or manual input from a local user. The decision module 202 may be programmed to decide to send video and audio signals only if the volume of the local audio signal is above a certain threshold. The decision module 202 may also decide to send video at given time intervals based on an internal timer or clock. The decision module 202 may be programmed such that the local user has control over the viewing of video. For instance, input from a local user may include the pressing of a virtual or physical button. By pressing the button, the user may choose to view one or more particular participants in the videoconference or may choose to send local video and audio signals to one or more other participants.

External factors are based on information received from various receivers 300 or from the network 102 and may include, by way of example, the volume of received audio signals, command signals received from remote users, or the status of the overall network. The decision module 202 may decide to send video and audio signals if all received audio signals are below a certain threshold. Similarly, the decision module 202 may decide not to send video signals if one or more received audio signals is above a certain threshold. Like the input from the local user, the remote user may choose, by pressing a virtual or physical button, to view a certain conference participant. In this instance, a command from such remote user's client is sent across the network 102 and received at the local client. Upon receiving such a command, the local client sends the current video and audio signals from the local client across the network to the remote user. The decision module 202 may also monitor the status of the overall network and decide not to send audio and/or video signals or to send signals at reduced data rate if, for instance, the network is too congested.

The decision module 202 may also use a combination of both internal and external factors in deciding whether to send audio and video signals. For instance, the decision module 202 may decide to send video and audio signals if the volume of the local audio signal is greater than the volume of every received audio signal and may otherwise decide to send only audio signals. The decision module 202 may be programmed to send audio and/or video signals based upon any one or more of the local and external factors discussed above, or any combination of one or more other factors. Furthermore, the external factors may also include information received from a centralized unit. For example, a centralized unit may compare the volumes of the audio signals for all clients participating in the videoconference and send to each client the address of the loudest one or more clients. The decision module 202 in the clients 104 may then use this information to determine whether to generate and send audio and/or video signals.

The encoder 206 encodes each signal before it leaves the sender 200. Since the signal is, preferably, encoded at the sender and sent to the receiver without any intermediate encoding or mixing at an MCU, the videoconferencing system avoids both tandem and multisource encoding. When the signal has been sent, the decoder 208 at the sending client terminal substantially simultaneously decodes the signal, and the signal is stored in reference memory 210. A reference memory 210 stores a copy of the last signal sent to each participant in the videoconference. In this manner, the sender is able to keep a record of the images that various receivers are displaying. Based on this reference memory 210, signals of differing resolutions may be sent to one or more of various receivers 300 that may be participating in the videoconference. With the use of the reference memory 210, a higher quality image may be sent because only the changes in the image are included in the sent signal. In some cases, the reference memory 210 is not used, for instance, when the first frame of a video image is sent in a given videoconference, if a new participant enters the videoconference, if there is an error in transmission, or at a predetermined time interval. In these cases, a signal representing the entire audio and video image may be sent, possibly with a lower quality resolution. Each individual instantiation of the encoder 206 along with its associated decoder 208 and reference memory 210 operates as is well known in the art. In one embodiment of the present invention, the multiple instantiations of encoders 206 and associated decoders 208 utilize a common set of instructions as is known in the art of computer programming. In one embodiment, identical information is sent to all receivers 300 by sender 200, and only a single reference memory 210 is maintained in sender 200. In another embodiment, the reference memories 210 for some receivers 300 are grouped in the sender 200, and that group of receivers 300 receives identical information from the sender 200.

Figure 3:
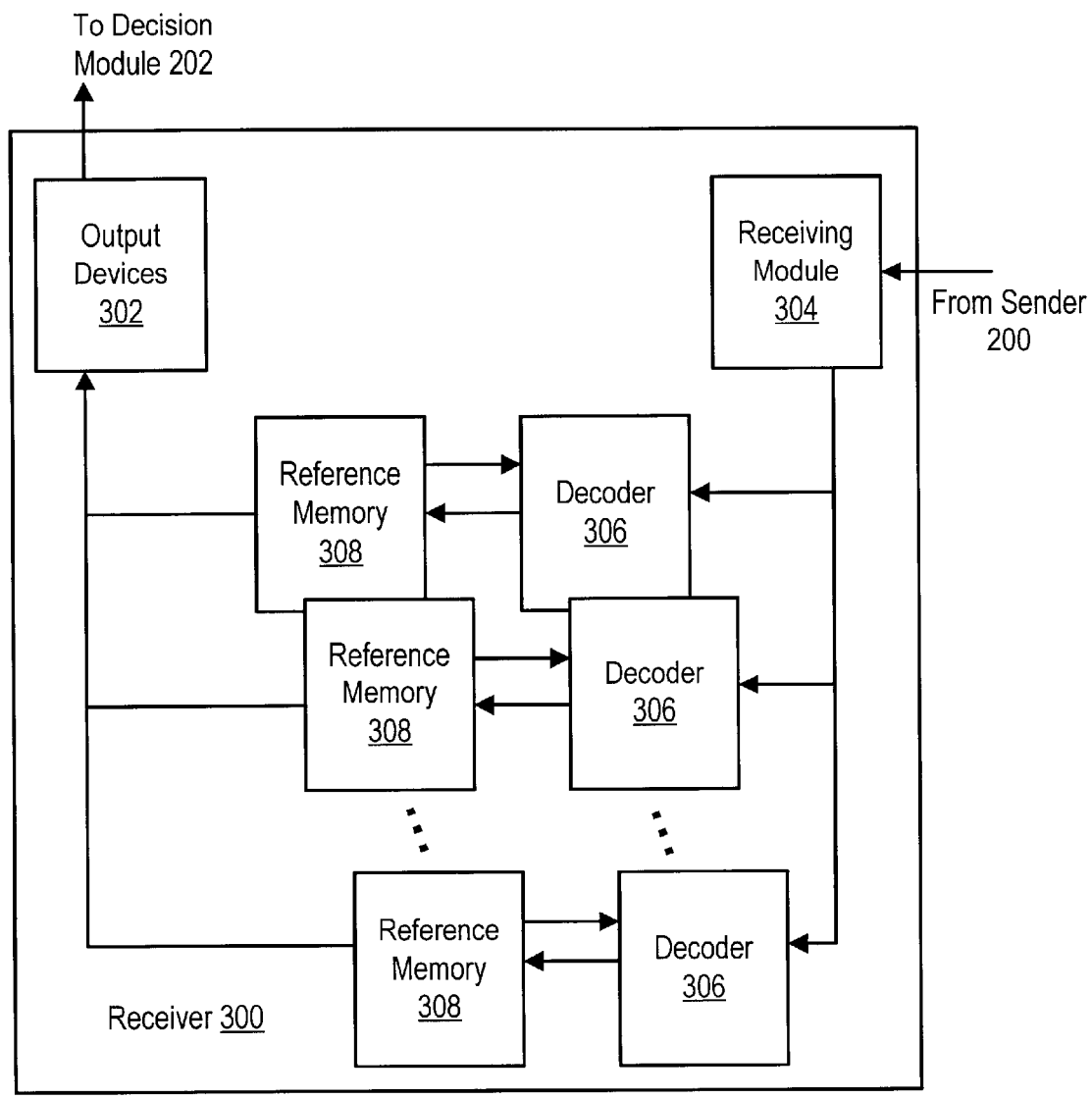
FIG. 3 is a block diagram of one embodiment of a receiving client.

FIG. 3 is a block diagram of one embodiment of a receiver 300. The receiver 300 includes output devices 302, a receiving module 304, one or more decoders 306, and one or more reference memories 308. The receiving module 304 is connected to each of the one or more decoders 306. Each decoder 306 is connected to a reference memory 308 such that each decoder-reference memory pair decodes and stores, respectively, signals from a different sender 200. The reference memories 308 are each connected to the output devices 302. The receiver 300 is the portion of the client 104 that is responsible for receiving audio and video signals from other participants in the videoconference. The output devices 302 present the signals to the user. In a preferred embodiment, the output devices 302 include at least one video display and audio speaker. The video display may display multiple video images in a possibly overlapping window format such that more than one participant in the videoconference may be simultaneously viewed on the video display.

The receiving module 304 receives the incoming encoded signals from one or more senders 200. Each decoder 306 decodes the signals received from a participant. If the receiver 300 is receiving signals from more than one participant, then the receiver 300 may utilize multiple decoders 306. These decoders 306 may be separate physical hardware components or may be multiplexed through the use of shared software instructions as is known in the art of computer programming. The decoders 306 are each connected to a reference memory 308 or an allocated portion of a larger memory. For example, assume a first sender 200 sends a signal to the receiver 300. This signal is received by the receiving module 304, decoded by the decoder 306 and stored in the reference memory 308 reserved for the first sender 200. The signal from a second sender 200 may be received, decoded by a second decoder 306 and stored in a second memory 308 reserved for the second sender.

Figure 4:
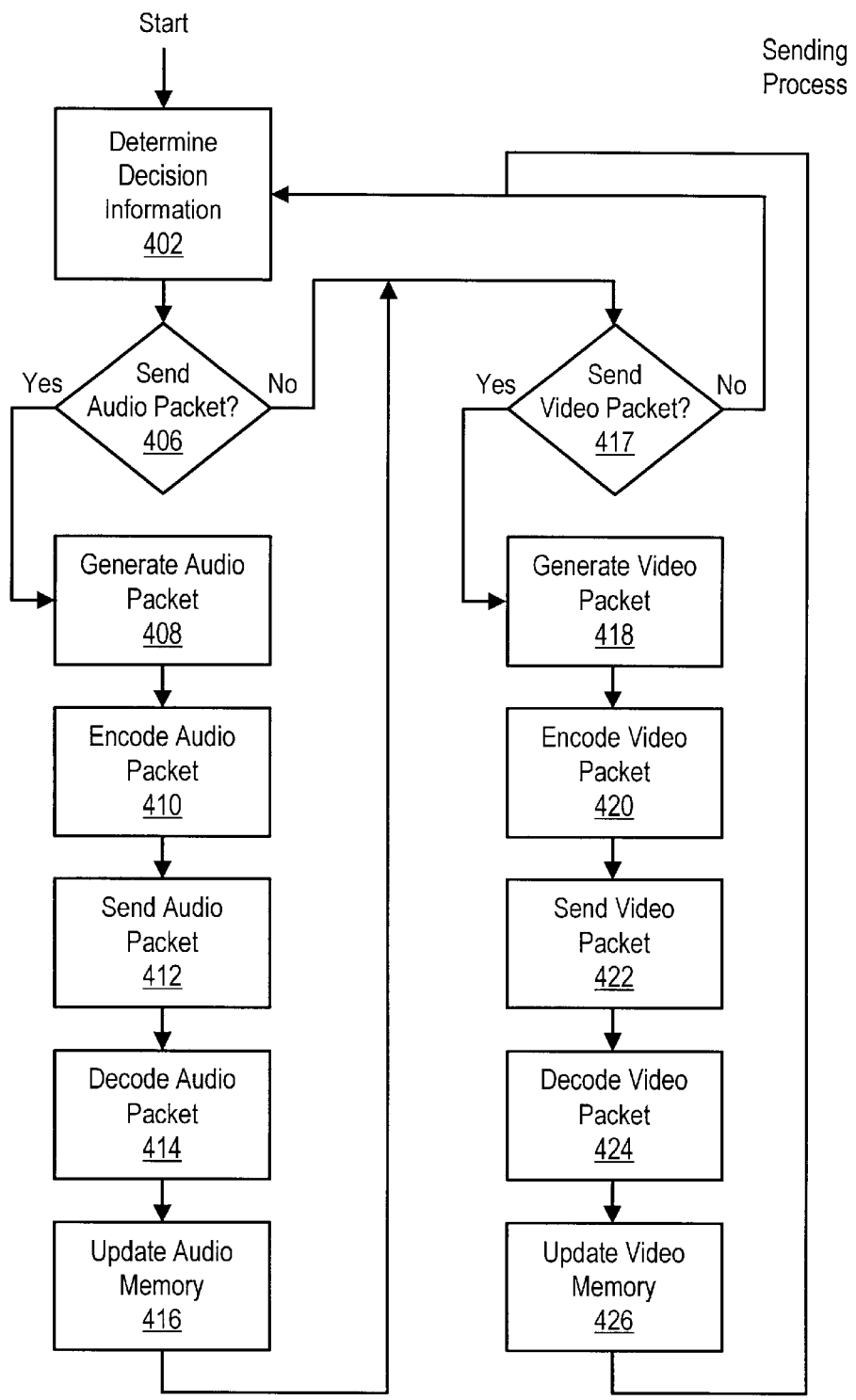
FIG. 4 is a flow diagram of preferred embodiment of a sending process.

FIG. 4 is a flow diagram of a preferred embodiment of the cyclic portion of a sending process. One-time initialization and termination processes are omitted for the sake of clarity. In step 402, the sending terminal 200 receives certain internal and/or external information relevant to the decision process. This information may be based upon local and/or external factors as discussed above. The decision information may be, for example, a volume indicator or a flag that indicates whether a local or external button is pressed. Based on this information, a preferred embodiment decides 406 whether to send audio signals. For instance, the decision module 202 may be programmed to send audio signals if the local volume indicator in the decision information is above all received volumes or if the decision information indicates that a particular button has been pressed or released.

In step 406, if the decision module 202 determines that the sender 200 is not going to send audio, then the sender 200, in step 417, determines whether to send video. If the decision module 202 determines that the sender 200 is going to send audio, then, in step 408, the signal generator 204 generates an audio packet. Note that the audio packet is generated only when the sender 200 will be sending an audio signal. By not generating any unsent signals, the sender 200 eliminates the unnecessary use of resources such as the resources required to remove loud speaker echoes from the microphone signal. The audio packet is then encoded 410, sent 412, and decoded 414. The reference memory 210 for the audio signal is then updated 416. The decision module 202 then determines whether to send a video signal.

If the decision module 202 determines, in step 417, that the sender 200 will send video signals, then the signal generator 204 generates 418 such signals. Note that the video signals are generated only when they will be transmitted, thus eliminating unnecessary use of resources in the generating of unsent signals. Once the video signals are generated, the encoder 206 encodes 420 the signals, and the sender 200 sends 422 the signals to the receiver 300. The decoder 208, located in the sender 200, decodes 424 a copy of the signals that were sent to the receiver 300. The sender updates 426 the reference memory 210 for the video signal with the last decoded video signal sent to the receiver. The sender 200 then returns to step 402 to repeat the process of determining whether to send another video signal, or the same video signal to another receiver 300 via network 102.

Note that the decision module 202 determines both whether to send audio signals and whether to send video signals. The decision module 202 may decide to send only audio signals, only video signals or both audio and video signals.

Figure 5:
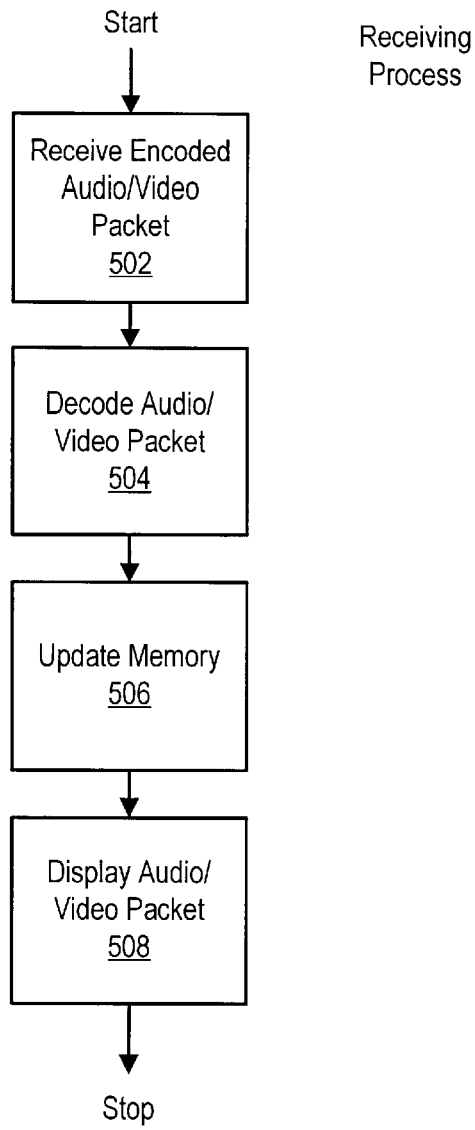
FIG. 5 is a flow diagram of a preferred embodiment of a receiving process.

FIG. 5 is a flow diagram of a preferred embodiment of a receiving process. The receiver 300 receives 502 an encoded video packet from some sender 200. The receiver then decodes 504 the video packet. The receiver 300 may similarly receive and decode audio signals. Note that the signals may be received directly from the sender 200 via network 102 and decoded without any intermediate encoding and decoding, thus preserving high signal quality and reducing delay and delay fluctuations. The receiver then updates 506 its reference memory 308 for the sender 200 that sent the packet. This receiver reference memory 308 contains virtually identical data to the reference memory 210 at the sender 200. As a result, if the sender 200 sends signals indicative only of changes since the last transmission, the receiver 300 may use these changes to update the last received signal that is stored in memory 308. The receiver then displays 508 the updated video image and plays the audio associated with the most recent transmission. The video images may be displayed in any number of ways including displaying individual windows for each sender, with one or more images displayed at a time. Audio signals may similarly be presented in any number of ways, including mixing the signals such that all senders are heard simultaneously, or presenting only the loudest signal. The determination of how such received signals are presented to the user of the receiver may be made by one or more various decision algorithms stored in a local processor (not shown) forming part of the receiver or under manual control of the user.

It will be apparent to those skilled in the relevant field that, in certain preferred embodiments, the subject invention may be used to wholly (or partially) eliminate the need for a complex and expensive MCU. In accordance with certain embodiments described herein, the MCU may be wholly eliminated, thus greatly reducing the cost and complexity of a videoconferencing facility.

The foregoing description is offered for illustrative purposes only. Numerous modifications and variations will be apparent to those skilled in the art based upon the foregoing discussion, while still falling within the spirit and scope of the invention claimed below and its equivalents.

We claim:

1. A method of managing videoconferencing signals for a videoconferencing system, the system including a sender for communication with a receiver, the sender operatively connected to a communication network, the method comprising the steps of:

receiving at the sender at least one input signal from the sender and one input signal from the receiver, wherein the input signals are representative of a condition at the sender or receiver, respectively;

deciding at the sender, responsive to input signals, whether to send a first videoconferencing signal, the input signals comprising a signal indicative of movement in a video image generated at the sender;

generating the first videoconferencing signal;

encoding the first videoconferencing signal responsive to the deciding; and sending the encoded first videoconferencing signal from the sender to the receiver.

2. The method of claim 1, further comprising:

receiving the encoded first videoconferencing signal at the receiver; and decoding the encoded first videoconferencing signal at the receiver.

3. The method of claim 1, wherein the at least one input signal includes a local signal originating at the sender and the deciding is based, at least in part, on the local signal.

4. The method of claim 3, wherein the local signal is representative of a volume of a local audio input at the sender.

5. The method of claim 3, wherein the local signal is a manual input from a user of the sender.

6. The method of claim 1, wherein the at least one input signal includes a remote signal originating at the receiver and the deciding is based, at least in part, on the remote signal.

7. The method of claim 6, wherein the remote signal is representative of a volume of an audio input at the receiver.

8. The method of claim 6, wherein the remote signal is representative of a manual input from a user of the receiver.

9. The method of claim 1, wherein the deciding further comprises comparing relative volumes of a local audio input at the sender and an audio input at the receiver based upon a signal received by the sender from the receiver.

10. The method of claim 1, wherein there exist multiple receivers operatively connected to the communication network and the sender receives signals from the multiple receivers, each signal including audio signals from each respective receiver and the deciding further comprises comparing the relative volumes of a local audio input and the received audio signals from the multiple receivers.

11. The method of claim 10, wherein the sender decides to encode when the volume of the local audio input is greater than the volume of the audio input at any receiver, as determined by the audio signals received at the sender.

12. The method of claim 10, wherein the comparing further comprises determining whether the local audio volume is greater than the audio volumes of some predetermined number of the multiple receivers.

13. The method of claim 1, wherein the communication network uses packet switching and the sender sends the encoded first videoconferencing signal as a series of packets addressed to the receiver.

14. The method of claim 1, further comprising sending a second videoconferencing signal from the sender to the receiver.

15. The method of claim 14, wherein the second videoconferencing signal conveys audio information.

16. The method of claim 1, wherein the first videoconferencing signal conveys video information.

17. The method of claim 1, further comprising the steps of:
deciding at the sender, responsive to the at least one input signal, whether to encode a second videoconferencing signal; and
sending the encoded second videoconferencing signal from the sender to the receiver.

18. A system for managing videoconferencing signals, comprising:
a sender for communication with a receiver, the sender operatively connected to a communication network, the sender including:
a decision module for receiving at least one input signal from the sender and one input signal from the receiver, the input signals representative of a condition at the sender or receiver, respectively, the decision module deciding at the sender, responsive to input signals, whether to encode a first videoconferencing signal, the input signals comprising a signal indicative of movement in a video image generated at the sender;
a signal generator for generating the first videoconferencing signal;
an encoder for encoding the first videoconferencing signal responsive to the deciding; and
a sending module for sending the encoded first videoconferencing signal from the sender to the receiver.

19. The system of claim 18, wherein the receiver further comprises:
a receiving module for receiving the encoded first videoconferencing signal from the sender; and
at least one decoder for decoding the encoded first videoconferencing signal at the receiver.

20. The system of claim 18, wherein the at least one input signal includes a local signal originating at the sender and the deciding is based, at least in part, on the local signal.

21. The system of claim 20, wherein the local signal is representative of a volume of a local audio input at the sender.

22. The system of claim 20, wherein the local signal is a manual input from a user of the sender.

23. The system of claim, 18, wherein the at least one input signal includes a remote signal originating at the remote receiver and the deciding is based, at least in part, on the remote signal.

24. The system of claim 23, wherein the remote signal is representative of a volume of an audio input at the receiver.

25. The system of claim 23, wherein the remote signal is representative of a manual input from a user of the receiver.

26. The system of claim 18, wherein the deciding further comprises comparing relative volumes of a local audio input at the sender and an audio input at the remote receiver based upon a signal received by the sender from the receiver.

27. The system of claim 18, wherein there exist multiple receivers operatively connected to the communication network and the sender receives signals from the multiple receivers, each signal including audio signals from each respective receiver and the deciding further comprises comparing the relative volumes of a local audio input and the received audio signals from the receivers.

28. The system of claim 27, wherein the sender decides to encode when the volume of the local audio input is greater than the volume of the audio input at any receiver, as determined by the audio signals received at the sender.

29. The system of claim 27, wherein the comparing further comprises determining whether the local audio volume is greater than the audio volumes of some predetermined number of the multiple receivers.

30. The system of claim 18, wherein the communication network uses packet switching and the sender sends the encoded first videoconferencing signal as a series of packets addressed to the receiver.

31. The system of claim 18, wherein the sending module sends a second videoconferencing signal from the sender to the receiver.

32. The system of claim 31, wherein the second videoconferencing signal conveys audio information.

33. The system of claim 18, wherein the first videoconferencing signal conveys video information.

34. The system of claim 18, wherein the decision module decides at the sender, responsive to the at least one input signal, whether to send a second videoconferencing signal; and the sending module sends the second videoconferencing signal from the sender to the receiver.

35. A computer program product for managing videoconferencing signals for a videoconferencing system, the system including a sender for communication with a receiver, the sender operatively connected to a communication network, comprising:
program code for receiving at the sender at least one input signal from the sender and receiver, wherein the input signal is representative of a condition at the sender or receiver, respectively, the input signal comprising a signal indicative of movement in a video image generated at the sender;
program code for deciding at the sender, responsive to the input signals, whether to send a first videoconferencing signal;
program code for generating the first videoconferencing signal;
program code for encoding the first videoconferencing signal responsive to the deciding; and
program code for sending the encoded first videoconferencing signal from the sender to the receiver.

36. The computer program product of claim 35, further comprising:
program code for receiving the encoded first videoconferencing signal at the receiver; and
program code for decoding the encoded first videoconferencing signal at the receiver.

37. The computer program product of claim 35, wherein the at least one input signal includes a local signal originating at the sender and the deciding is based, at least in part, on the local signal.

38. The computer program product of claim 37, wherein the local signal is representative of a volume of a local audio input at the sender.

39. The computer program product of claim 37, wherein the local signal is a manual input from a user of the sender.

40. The computer program product of claim 35, wherein the at least one input signal includes a remote signal originating at the receiver and the deciding is based, at least in part, on the remote signal.

41. The computer program product of claim 40, wherein the remote signal is representative of a volume of an audio input at the receiver.

42. The computer program product of claim 40, wherein the remote signal is representative of a manual input from a user of the receiver.

43. The computer program product of claim 35, wherein the program code for deciding further comprises program code for comparing relative volumes of a local audio input at the sender and an audio input at the receiver based upon a signal received by the sender from the receiver.

44. The computer program product of claim 35, wherein there exist multiple receivers operatively connected to the communication network and the sender receives signals from the multiple receivers, each signal including audio signals from each respective receiver and the program code for deciding further comprises program code for comparing the relative volumes of a local audio input and the received audio signals from the multiple receivers.

45. The computer program product of claim 44, wherein the sender decides to encode when the volume of the local audio input is greater than the volume of the audio input at any receiver, as determined by the audio signals received at the sender.

46. The computer program product of claim 44, wherein the program code for comparing further comprises program code for determining whether the local audio volume is greater than the audio volumes of some predetermined number of the multiple receivers.

47. The computer program product of claim 35, wherein the communication network used packet switching and the sender sends the firs videoconferencing signal as a series of packets addressed to the receiver.

48. The computer program product of claim 35, further comprising sending a second videoconferencing signal to the sender to the receiver.

49. computer program product of claim 48, wherein the second videoconferencing signal coveys video information.

50. The computer program product of claim 35, wherein the first videoconferencing signal conveys information.

51. The computer program product of claim 35, further comprising:

program code for deciding at the sender, responsive to the at least one input signal, whether to send a second videoconferencing signal; and program code for sending the second videoconferencing signal from the sender to the receiver.

* * * * *